United States Patent
Murphy et al.

(10) Patent No.: US 6,613,400 B1
(45) Date of Patent: Sep. 2, 2003

(54) CREAM

(76) Inventors: Michael Laurence Murphy, Ballyderown Kilworth, County Cork (IE); Timothea Miriam Murphy, Northview, Duntaheen Road, Fermoy, County Cork (IE)

(*) Notice: Subject to any disclaimer, the term of this patent is extended or adjusted under 35 U.S.C. 154(b) by 292 days.

(21) Appl. No.: 09/640,985

(22) Filed: Aug. 18, 2000

(30) Foreign Application Priority Data

Aug. 20, 1999 (EP) .............................................. 99650073

(51) Int. Cl.⁷ ........................ A23C 13/00; A23C 13/12; A23C 13/14
(52) U.S. Cl. ........................ 427/570; 426/573; 426/576; 426/577; 426/590; 426/613; 426/329; 426/330.3
(58) Field of Search ................................. 426/573, 576, 426/577, 564, 613, 329, 330.3, 590, 570

(56) References Cited

U.S. PATENT DOCUMENTS

| | | | |
|---|---|---|---|
| 4,943,443 A | * 7/1990 | Evers | 426/569 |
| 5,597,604 A | * 1/1997 | Chalupa et al. | 426/590 |
| 6,322,841 B1 | * 11/2001 | Jackson et al. | 426/582 |

FOREIGN PATENT DOCUMENTS

| | | | |
|---|---|---|---|
| EP | 0 292 034 | | 11/1988 |
| EP | 0 884 003 | | 12/1998 |
| GB | 1 467 422 | * | 3/1977 |
| GB | 2 211 393 | | 7/1989 |
| GB | 2 261 805 | * | 6/1993 |
| WO | 96/13177 | * | 5/1996 |

* cited by examiner

*Primary Examiner*—Nina Bhat
(74) *Attorney, Agent, or Firm*—Burns, Doane, Swecker & Mathis, LLP

(57) ABSTRACT

A cream for use as a topping on beverages, such that the cream floats on the surface of the beverage, whether hot or cold. The cream contains a hydrocolloid fluid gelling agent at a concentration sufficient to form a fluid gel which is subsequently sheared. This enables the cream to float on beverages, whilst maintaining its inherent stability and remaining immiscible with other liquids whether hot or cold. Usually the gelling agent has a concentration between 0.05 and 2% by weight.

64 Claims, No Drawings

CREAM

TECHNICAL FIELD

The present invention relates to a cream and in particular to one which floats on hot and cold beverages whilst maintaining its inherent stability and remaining immiscable with other liquids, whether hot or cold. The cream is particularly suited for use instead of conventional pouring cream.

Fresh cream is often used as a topping for both hot and cold cakes, puddings and desserts. Cream is similarly used as a topping on hot beverages particularly on coffee liqueurs. Ireland is famed for its Irish or Gaelic Coffee, which traditionally consists of a measure of Irish whiskey, sugar and strong black coffee, the solution stirred and topped off with slightly aerated heavy cream. Many permutations and combinations of this drink exist presently using multiple variations of spirits to be mixed with the coffee including: brandy (French Coffee) and vodka (Russian Coffee), to name but a few. The common factor between all of these liqueur coffees is the cream as a topping.

The signature of the liqueur coffee is a black layer of coffee topped with the white layer of cream. It takes a very skilled bartender to be able to apply the cream to the top of the beverage without it sinking into the black coffee below. The true flavour of the liqueur coffee is obtained by drinking the dark coffee and liqueur through the cream. Additionally, appearance is important. The cream should not mix into the coffee but should present a distinct layer. Ideally, there should be a black liquid topped by an almost white head or layer. In order for the cream to float it must be slightly aerated and therefore must be whipped. However, the shelf life of the cream is very short. Often, the cream sinks into the coffee destroying the colour and concept of this traditional drink. If the cream is over whipped, such as the cream that comes from a storage can which is often used on liqueur coffees, the cream is too stiff destroying the essence of drinking the coffee through the cream and the stiff cream quickly descends into the coffee below producing in any case an unsightly beverage which additionally does not provide the desired tasting experience.

An additional characteristic of cream which is not ideal is that when used on hot beverages such as coffee, the cream melts with the hot temperature. The properties of the melted cream do not at all resemble those of the fresh cream from the refrigerator. The cream is runny and not as flavourful.

Cream with its excellent taste and organoleptic feel, as with foods that are delicious, is high in saturated fats. Continual consumption of saturated fats has been shown to be involved in the development of degenerative diseases including cardiovascular disease, cancer, diabetes, multiple sclerosis (MS) and many more. Thus, it is now not considered wise to over indulge in saturated fats. Thus to frequently consume cream as a topping for drinks and desserts is not presently a popular thing to do where health is concerned. Therefore, it would be advantageous to provide a low fat cream topping.

In this specification, unless otherwise indicated, the term cream refers to an emulsion of fat globules encased in protein or a cream substitute that has the organoleptic mouth feel qualities of natural cream and can additionally contain alternative fat to milk fat, protein, emulsifiers and stabilisers.

The term "fluid gel" refers to a gel that has been sheared after setting, or during he process of setting.

The term "milk fat" refers to the fat that is unique to milk.

The term "fluid gelling agent" refers to the active ingredient which when mixed with water at concentrations sufficient to form a solid gel can subsequently be sheared to form a fluid gel.

SUMMARY OF THE INVENTION

The invention concerns a cream wherein the cream includes a fluid gelling agent, the fluid gelling agent is at a concentration sufficient to form a solid gel which is subsequently sheared.

The advantage of having a fluid gel present in combination with the cream is that it forms a matrix and essentially encapsulates the fat in the cream. This has the effect to confer the specific gravity properties of the fat to the gel enabling the cream to float on both hot and cold drinks.

Surprisingly, the cream containing the matrix formed around the fats does not melt when poured carefully onto a hot beverage. The matrix formed, encapsulating the fats, protects the fat from the heat of the hot beverage. Additionally, the matrix also protects certain gelling agents with melting points lower than the temperature of a hot beverage from melting due to the formation of a complex between the gelling agent and the cream or milk protein conferring a resistance to heat.

In a preferred embodiment, the concentration of the gelling agent present is greater than 0.05% by weight and does not exceed 2% ideally the concentration is greater than 0.15% by weight and does not exceed 0.3% by weight.

There is a minimum concentration of gelling agent necessary.

In one embodiment, the gelling agent is a hydrocolloid gelling agent. In another embodiment, the gelling agent is selected from the group comprising: gellan gum; pectin; agarose; carrageenan; locust bean gum, agar and other hydrocolloids, or combination of hydrocolloids that form stable fluid gels. It is advantageous to use hydrocolloid gelling agents as they successfully product stable fluid gels.

In a preferred embodiment of the invention, the fat content is preferably between 10% and 40% by weight, most preferably 18–40% and ideally 22 to 30%.

The presence of the matrix encapsulating the fat enables the inclusion of fat to high levels. It also enables the reduction of the fat to low levels, without affecting the organoleptic or mouth feel quality of the cream.

In an especially preferred embodiment, the fluid gelling agent is heat resistant or forms a complex with the cream or milk protein which confers heat resistance. This confers the properties as previously discussed of enabling the cream to float on hot liquids without melting.

In another embodiment of the invention, an emulsifier is not required.

Ideally, suitable flavourings can be added to the cream and in many instances, the cream further comprises a sequestrant which sequestrant, for example, can be chosen from sodium citrate, sodium hexametaphosphate, and EDTA, or indeed any other suitable sequestrant.

Almost certainly, many creams according to the present invention will have additional fat chosen, for example, by the additional of animal fat, vegetable fat or indeed vegetable oil. Again, additional protein such as chosen from one or more of whey protein concentrate, sodium caseinate, potassium caseinate, soya protein, egg albumin and hydrolysed gelatins may be added.

In many instances, an emulsifier will be added to the cream and suitable emulsifiers are, for example, sodium stearyl lectylate (SSL), lacithin, lecithin derivatives, and glycerol monostearate (GMS).

Further, the invention provides a method of preparing a cream comprising adding to liquid milk containing saturated fat, a fluid galling agent and then, forming a gel and subsequently shearing the gel to form a liquid. Depending on the type of gelling agent, it may or may not have to be hydrolysed prior to mixing with the milk. Emulsifiers may be used prior to formation of the gel. Suitable emulsifiers have been listed above.

Ideally, the gel is homogenised and subsequently the cream product is pasteurised or subject to ultra high temperature heat treatment (UHT). In formation of the cream product, sequestrant is often added which sequestrant can be chosen from very suitable sequestrants. Again, additional fats and protein can be added in the manufacturing process.

DETAILED DESCRIPTION OF THE PREFERRED EMBODIMENTS

The invention will be more clearly understood by way of example with reference to the following description and examples.

The cream is made in two separate operations or parts. In Part 1, the gelling solution is made separately to the rest of the product and added as a hot liquid to the rest of the solutions prior to UHT heat treatment or pasteurisation. Part 2 involves the mixing and heating of the ingredients to form a base for the cream.

A gelling agent can be defined as an agent capable of converting water from a flowable liquid to a gel or solid. A fluid gel is a pourable gel. Examples of gelling agents are gellan gum, agar, gelatin, starch, pectin, carrageenan, agarose, dextran, rhamsan gum, xanthan gum, welan gum, locust-bean gum, tamarind gum, guar gum and methyl cellulose to name but a few. The gelling agent which is preferably used in the present invention is gellan gum, but other agents may be used. Gellan gum is considered heat resistant due to its melting point exceeding 80° C.

Gellan gum is a multi-functional gelling, texturising, stabilising, film-forming and suspending agent whose properties offer numerous advantages in the commercial production of food and other products. Gellan gum, the commercial product, is a low acyl product sold under the Trade Mark KELCOGEL®. In order to form a gel, gellan gum must first be hydrated and then allowed to form the gel. Gellan gum forms gels with almost all ions, with divalent ions having a much stronger affinity than monovalent ions. To achieve hydration of gellan gum, ions have to be removed from the aqueous environment as the presence of ions inhibits hydration. A convenient way to do this is to use a sequestrant or ion removing agent, for example sodium citrate, which removes ions and sets up an equilibrium situation. Hydration of gellan gum is easily achieved by dispersing the gum in deionised water, without sequestrant and heating to at least 70° C. Ions, such as sodium or calcium, are then added to the hot solution, causing it to gel on cooling. Fluid gels are commonly formed by agitating the gel mix during the cooling cycle which disrupts the normal gel formation process. Fluid gels may also be made by breaking up the gel and shearing it after it has set. Very low levels of gellan gum produce fluid gels, typically in the range of 0.04 to 0.3%. Gellan gum is a fluid gelling agent. in the case of fluid gels made with agents other than gellan gum, those made with agar or carrageenan, for example, the gels do not require the removal of ions in order to hydrate. Therefore, the cream can be made with the powdered gel added with the other dry ingredients added at the start of the manufacturing procedure.

The cream in which gellan gum is used to produce the fluid gel is made in two discrete operations or processes as mentioned above. In the first part, Part 1, the gellan solution is made separately to the rest of the product and added to the rest of the solution as a hot liquid prior to homogenisation. Part 2 involves the addition and heating of the other ingredients.

In the present invention, the gelling solution is made by adding first sodium citrate and then the gellan powder to the water. The mixture must be heated to 80° C. while being agitated to ensure the solubilisation and activation of the gellan gum. The gellan solution may also be manufactured by adding the gellan powder to deionised water, with no added sequestrant and heating to above 70° C.

As stated above, Part 2 involves the mixing and heating of the ingredients to form the base for the cream. The ingredients consist of fat, water and emulsifier. The general procedure is as follows:

1. The fat, for example milk fat, vegetable fat, vegetable oil or animal fat and some of the water are added to a mixing vessel and heated to 40° C. while agitating.
2. Additional protein, for example whey protein concentrate, sodium caesinate, potassium caesinate, soya protein, egg albumin or hydrolysed gelatine and an emulsifier, for example sodium stearyl factylate (SSL—manufactured by the Quest Company), lecithin, lecithin derivatives or glycerol monostearate (GMS) are added to the mixing vessel and heating is continued to 60° C. However, it is not always necessary to include an emulsifier.
3. The remainder of the water and heated gelling solution are added to the base mixture and mixed for several minutes to ensure even distribution of the gel.
4. The mixture at 60° C. is homogenised using a two-stage homogenisation at 3000 psi in a first stage and then at 500 psi in a second stage. Alternatively, a single stage homogenisation or homogenisation of a much lower pressure could be used. Alternatively, the product is homogenised before the addition of the gellan solution which is subsequently added, mixed and homogenised a second time.
5. Following the homogenisation the mixture is cooled using an agitated jacketed tank and cold water or any type of heat exchanger, for example a scraped surface heat exchanger. It is most important that the mixture receives thorough shearing while cooling. The mixture is cooled to below 13° C. Once the gelling agent has set, it is possible to break it up again after cooling using a shearing device to produce a smooth liquid.
6. The cream maybe further modified via the addition of colouring, flavoring or sweeteners. Sweeteners and flavours, for example, fructose, sorbitol and brown sugar flavour may be added to taste either before or after homogenisation and cooling.
7. A sequestrant, for example, sodium citrate, sodium hexametaphosphate or EDTA may be added to the final cream mixture to prevent further gelling. The sequestrant may be added before or after homogenisation and cooling. If the mixture is manufactured from deionised water and butter, oil or washed cream, it is possible that no sequestrant may be needed to prevent age gellation occurring.
8. The product is either ultra high temperature heat treated (UHT) and packed aseptically to produce a product that must be refrigerated after opening the carton or pasteurised to produce a product with a short refrigerated shelf life.
9. The cream which uses gellan gum to provide the fluid gel is made in two stages for two reasons. Firstly, because the gellan gum will not hydrate in the presence of ions, therefore it must be dissolved in deionised water or water with added sequestrant. Secondly, because of the high temperature required to make the solution. However, if other gelling agents are used such as agar or carrageenan, it may be possible to prepare the cream in a one step process.

Part 1 of the manufacturing process would be removed and steps 1–8 of Part 2 would be carried out as previously described, with the addition of the gel powder at step 2 along with the other powdered ingredients.

The fluid gel forms a matrix which encapsulates the fats in the cream. This has multiple effect By. forming a matrix around the fats, the fluid gel acquires the specific gravity properties of the fats in the cream enabling the cream to float on liquids both hot and cold. The cream similarly floats on alcohol containing liquids. Secondly, the matrix formed around the fats protects the fats from the heat of a hot beverage. Thirdly, the gel acts to stabilise the cream.

The following examples 1 to 7 are examples of cream formulations demonstrating a fat content ranging from high to low. The cream according to all formulations has excellent ability to float on cold and hot beverages, does not melt on hot beverages or desserts, and has good long term stability at both ambient temperature and at elevated temperatures up to or of the order of 45° C.

EXAMPLE 1

The preparation of the cream was carried out using a two part process. The gelling agent used was gellan gum and the optimal concentration appears to be 0.16% for stability on a pilot experimental scale.

Part 1

Preparation of the Gelling Agent

| Ingredient | % by weight | % in total | Kg |
| --- | --- | --- | --- |
| Gellan gum | 2.00 | 0.16 | 0.032 |
| Sodium citrate | 0.10 | 0.008 | 0.0016 |
| Water | 98.00 | 7.84 | 1.568 |
|  | 100.00 | 8.00 | 1.6 |

Ingredients were mixed and heated to 85° C. to hydrate the gel. The mixture was then allowed to cool and gel.

| Ingredient | % in total w/w |
| --- | --- |
| Gelling agent | 8.00 |
| Cream (48.5% fat) | 45.36 |
| SSL | 0.46 |
| Whey P.IC7705 | 0.8 |
| Water | to 100% |

There was 22% fat in final product.

Homogenisation was carried out at 2000 psi following homogenisation the product was cooled in an agitated tank to 12° C.

0.2% sodium citrate was added after manufacture.

EXAMPLE 2

| Ingredients | % in total w/w |
| --- | --- |
| Gelling agent | 8.00 |
| Cream (48.5% fat) | 45.36 |
| SSL | 0.46 |
| Sodium caesinate | 0.5 |
| Water | to 100% |

22% fat was present in the final product.

Homogenisation was carried out at 2000 psi, following homogenisation the product was cooled in an agitated jacket tank to 12° C.

0.2% sodium citrate was added after manufacture.

EXAMPLE 3

| Ingredients | % in total w/w |
| --- | --- |
| Gelling agent | 8.00 |
| Cream (50% fat) | 60.00 |
| SSL | 0.46 |
| Sodium caesinate | 1.6 |
| Water | to 100% |

30% fat was present in the final product.

Homogenisation was carried out at 2000 psi. Following homogenisation the product was cooled in an agitated jacket tank to 12° C.

0.2% sodium citrate was added after manufacture.

EXAMPLE 4

| Ingredients | % in total w/w |
| --- | --- |
| Gelling agent | 8 |
| Cream (48.5%) | 45.38 |
| SSL | 0.46 |
| Sodium caesinate | 1.00 |
| Water | to 100% |

22% fat was present in final product.

Homogenisation was carried out at 2000 psi. Following homogenisation the product was cooled in an agitated jacket tank to 12° C.

0.2% sodium citrate was added after manufacture.

EXAMPLE 5

| Ingredients | % in total w/w |
| --- | --- |
| Gelling agent | 8 |
| Cream (48.5%) | 45.36 |
| SSL | 0.46 |
| Whey protein | 0.5 |
| Sodium citrate | 0.2 |
| Water | to 100% |

There was 22% fat in the final product. Homogenisation was carried out at 2500 psi and cooling to 11° C. in the agitated jacketed tank.

EXAMPLE 6

| Ingredients | % in total w/w |
| --- | --- |
| Gelling agent | 16 |
| Cream (48.5%) | 30 |
| SSL | 0.5 |
| Whey protein | 0.5 |
| Sodium citrate | 0.2 |
| Water | to 100% |

There was 15% fat in the final product. Homogenisation was carried out at 2500 psi and cooling to 12° C. was carried out in the agitated jacketed tank.

EXAMPLE 7

| Ingredients | % in total w/w |
| --- | --- |
| Gelling agent | 20 |
| Hydrolysed Gelatin | 1.5 |
| Cream (48.5%) | 20 |
| SSL | 0.5 |
| Water | to 100% |

There was 10% fat in the final product. Homogenisation was carried out at 2500 psi and cooling to 13° C. in the agitated jacketed tank.

The inherent properties of the cream according to the invention may make it particularly suitable as an additive or as a stage in the production of other products.

In the specification, the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiment hereinbefore described but may be varied in both construction and detail within the scope of the claims.

What is claimed is:

1. A cream in the form of a liquid comprising a sheared gel comprising:
   milk;
   saturated milk fat; and
   a gelling agent at a concentration sufficient to form a gel.
2. A cream as claimed in claim 1, wherein the concentration of the fluid gelling agent is between 0.05% and 2% by weight.
3. A cream as claimed in claim 1, wherein the concentration of the fluid gelling agent present is between 0.15% and 0.3% by weight.
4. A cream as claimed in claim 1, wherein the fluid gelling agent is a hydrocolloid gelling agent.
5. A cream as claimed in claim 1, wherein the gelling agent is selected from the group consisting of:
   gellum gum;
   pectin;
   agarose;
   carrageenan;
   agar;
   locust bean gum;
   any hydrocolloid; and
   any combination of hydrocolloids which forms a stable fluid gel.
6. A cream as claimed in claim 1, wherein the fat content is greater than 10% by weight.
7. A cream as claimed in claim 1, wherein the fat content is between 18 and 40% by weight.
8. A cream as claimed in claim 1, wherein the fat content between is 22 and 30% by weight.
9. A cream as claimed in claim 1, wherein the fat content does not exceed 10%.
10. A cream as claimed in claim 1, in which the cream contains suitable flavourings.
11. A cream as claimed in claim 1, in which the cream further comprises a sequestrant.
12. A cream as claimed in claim 1, cream further comprises a sequestrant selected from the group consisting of sodium citrate; sodium hexametaphosphate; and EDTA.
13. A cream as claimed in claim 1, in which the cream comprises additional fat selected from the group consisting of animal fat, vegetable oil, and vegetable fat.
14. A cream as claimed in claim 1, in which the cream comprises additional protein.
15. A cream as claimed in claim 1, in which the cream comprises additional protein selected from the group consisting of:
    whey protein concentrate,
    sodium caseinate,
    potassum caseinate,
    soya protein,
    egg albumin, and
    hydrolysed gelatine.
16. A cream as claimed in claim 1, in which the cream comprises an emulsifier.
17. A cream as claimed in claim 1, in which the cream comprises an emulsifier selected from the group consisting of:
    sodium stearyl lactylate (SSL),
    lecithin,
    lecithin derivatives, and
    glycerol monostearate (GMS).
18. A cream in the form of a liquid comprising a sheared gel comprising:
    milk;
    saturated milk fat; and
    a hydrocolloid fluid gelling agent at a concentration between 0.05% and 2.0% by weight.
19. A cream as claimed in claim 18, wherein the concentration of the fluid gelling agent present is between 0.15% and 0.3% by weight.
20. A cream as claimed in claim 18, wherein the gelling agent is selected from the group consisting of:
    gellum gum;
    pectin;
    agarose;
    carrageenan;
    agar;
    locust bean gum;
    any hydrocolloid; and
    any combination of hydrocolloids which forms a stable fluid gel.
21. A cream as claimed in claim 18, wherein the fat content is grater than 10% by weight.
22. A cream as claimed in claim 18, wherein the fat content is between 18 and 40% by weight.

23. A cream as claimed in claim 18, wherein the fat content between is 22 and 3% by weight.

24. A cream as claimed in claim 18, wherein the fat content does not exceed 10%.

25. A cream as claimed in claim 18, in which the cream contains suitable flavourings.

26. A cream as claimed in claim 18, in which the cream further comprises a sequestrant.

27. A cream as claimed in claim 18, in which the cream further comprises a sequestrant selected from the group consisting of sodium citrate; sodium hexametaphosphate; and EDTA.

28. A cream as claimed in claim 18, in which the cream comprises additional fat selected from the group consisting of animal fat, vegetable oil, and vegetable fat.

29. A cream as claimed in claim 18, in which the cream comprises additional protein.

30. A cream as claimed in claim 18, in which the cream comprises additional protein selected from the group consisting of:
   whey protein concentrate,
   sodium caseinate,
   potassium caseinate,
   soya protein,
   egg albumin, and
   hydrolysed gelatine.

31. A cream as claimed in claim 18, in which the cream comprises an emulsifier.

32. A cream as claimed in claim 18, in which the cream comprises an emulsifier selected from the group consisting of:
   sodium stearyl lactylate (SSL),
   lecithin,
   lecithin derivatives, and
   glycerol monostearate (GMS).

33. A floating cream in the form of a liquid comprising a sheared gel comprising:
   milk;
   saturated milk fat; and
   a hydrocolloid fluid gelling agent at a concentration between 0.05% and 2.0% by weight, said gelling agent encapsulating at least come of the fat to provide a stable product.

34. A cream as claimed in claim 33, wherein the concentration of the fluid gelling agent present is between 0.15% and 0.3% by weight.

35. A cream as claimed in claim 33, wherein the gelling agent is selected from the group consisting of:
   gellum gum;
   pectin;
   agarose;
   carrageenan;
   agar;
   locust bean gum;
   any hydrocolloid; and
   any combination of hydrocolloids which forms a stable fluid gel.

36. A cream as claimed in claim 33, wherein the fat content is greater than 10% by weight.

37. A cream as claimed in claim 33, wherein the fat content is between 18 and 40% by weight.

38. A cream as claimed in claim 33, wherein the fat content between is 22 and 30% by weight.

39. A cream as claimed in claim 33, wherein the fat content does not exceed 10%.

40. A cream as claimed in claim 33, in which the cream contains suitable flavourings.

41. A cream as claimed in claim 33, in which the cream further comprise a sequestrant.

42. A cream as claimed in claim 33, in which the cream further comprises a sequestrant selected from the group consisting of sodium citrate; sodium hexametaphosphate; and EDTA.

43. A cream as claimed in claim 33, in which the cream comprises additional fat selected from the group consisting of animal fat, vegetable oil, and vegetable fat.

44. A cream as claimed in claim 33, in which the cream comprises additional protein.

45. A cream as claimed in claim 33, in which the cream comprises additional protein selected from the group consisting of:
   whey protein concentrate,
   sodium caseinate,
   potassium caseinate,
   soya protein,
   egg albumin, and
   hydrolysed gelatine.

46. A cream as claimed in claim 33, in which the cream comprises an emulsifier.

47. A cream as claimed in claim 33, in which the cream comprises an emulsifier selected from the group consisting of:
   sodium stearyl lactylate (SSL),
   lecithin,
   lecithin derivatives, and
   glycerol monostearate (GMS).

48. A method of preparing a cream comprising:
   hydrating a fluid gelling agent;
   allowing the hydrated fluid gelling agent to cool;
   adding liquid milk containing saturated fat;
   carrying out a shearing step at some stage after the fluid gelling agent has been hydrated.

49. A method as claimed in claim 48 in which the gel is homogenised.

50. A method as claimed in claim 48, in which the cream is subsequently pasteurised.

51. A method as claimed in claim 48, in which the cream is subsequently ultra high temperature heat treated (UHT).

52. A method as claimed in claim 48, in which suitable flavourings are added.

53. A method as claimed in claim 48, in which a sequestrant is added.

54. A method as claimed in claim 48, in which a sequestrant chosen from sodium citrate, sodium hexametaphosphate, and EDTA is added.

55. A method as claimed in claim 48, in which additional fat selected from the group consisting of animal fat, vegetable oil, and vegetable fat is added to the liquid milk.

56. A method as claimed in claim 48, in which additional protein is added.

57. A method as claimed in claim 48, in which additional protein selected from the group consisting of:
   whey protein concentrate,
   sodium caseinate,
   potassium caseinate,
   soya protein,
   egg albumin, and
   hydrolysed gelatine is added.

58. A method as claimed in claim 48, in which an emulsifier is added prior to formation of the gel.

59. A method as claimed in claim 48, in which an emulsifier selected from the group consisting of:
  sodium stearyl lactylate (SSL),
  lecithin,
  lecithin derivatives, and
  glycerol monostearate (GMS) is added.

60. A method of preparing a cream comprising:
  adding to liquid milk containing saturated fat, a fluid gelling agent;
  forming a gel; and
  subsequently shearing the gel to form a liquid.

61. A method as claimed in claim 60, in which a sequestrant selected from the group consisting of sodium citrate; sodium hexametaphosphate; and EDTA is added.

62. A method as claimed in claim 60, in which additional fat selected from the group consisting of animal fat, vegetable oil, and vegetable fat is added to the liquid milk.

63. A method as claimed in claim 60, in which additional protein selected from the group consisting of:
  whey protein concentrate,
  sodium caseinate,
  potassium caseinate,
  soya protein,
  egg albumin, and
  hydrolysed gelatine is added.

64. A method as claimed in claim 60, in which an emulsifier selected from the group consisting of:
  sodium stearyl lactylate (SSL),
  lecithin,
  lecithin derivatives, and
  glycerol monostearate (GMS) is added.

* * * * *